US005828839A

United States Patent [19]
Moncreiff

[11] Patent Number: 5,828,839
[45] Date of Patent: Oct. 27, 1998

[54] COMPUTER NETWORK CHAT ROOM BASED ON CHANNEL BROADCAST IN REAL TIME

[75] Inventor: Craig T. Moncreiff, San Diego, Calif.

[73] Assignee: Interactive Broadcaster Services Corp., La Jolla, Calif.

[21] Appl. No.: 749,091

[22] Filed: Nov. 14, 1996

[51] Int. Cl.$^6$ .................................................. G06F 15/16
[52] U.S. Cl. ................... 395/200.34; 395/200.47
[58] Field of Search ................ 395/200.34, 200.57, 395/200.6, 200.47, 200.54; 345/330; 370/260

[56] References Cited

U.S. PATENT DOCUMENTS

| 5,236,199 | 8/1993 | Thompson | 273/439 |
| 5,530,469 | 6/1996 | Garfinkle | 348/1 |
| 5,537,143 | 7/1996 | Steingold | 348/13 |
| 5,561,708 | 10/1996 | Remillard | 379/96 |
| 5,694,163 | 12/1997 | Harrison | 348/13 |

OTHER PUBLICATIONS

Oikarinen et al, "Internet Relay Chat Protocol," Network Working Group, RFC 1459, May 1993 pp. 1–69.
Matt Kramer, "iChat 2.0's Web Found Ideal for Tours Thinking," PC Week, v13, n37, Sep. 16, 1996 p. 93(1).
"AOL Web Browser Previews Online," Newsbytes News Network, May 10, 1995.
Brian Wilson, "Two Approaches to Internet Broadcasting," Windows Sources, v4, n10 Oct. 96 p. (152).

*Primary Examiner*—Mehmet B. Geckil
*Attorney, Agent, or Firm*—John L. Rogitz

[57] ABSTRACT

A computer network chat room system includes plural chat rooms, with the conversation in each chat room being related to the program being broadcast real-time over a respective TV or radio channel in a user-defined time zone. Computer users access the chat rooms via the Internet by inputting their desired television or radio channel, along with a request to enter a chat room. A chat window is presented to the users of the system, along with a Web page window relating to the program currently being broadcast over the respective channel, and two advertising windows that also relate to the current program that is the discussion topic of the respective chat room. Additionally, a merchandising window can be presented for effecting transactions of merchandise that relates to the current program. A time zone-dependent channel guide is also advantageously provided to the computer users.

17 Claims, 7 Drawing Sheets

COMPUTER NETWORK CHAT ROOM BASED ON CHANNEL BROADCAST IN REAL TIME

FIELD OF THE INVENTION

The present invention relates generally to wide area computer networks, and more particularly to so-called "chat rooms" that are accessed via the Internet.

BACKGROUND

Use of and applications for Internet networks, including the so-called "World Wide Web" ("Web"), increases daily. The Web is a network of computer information storage sites, and each site can include one or more information displays, colloquially referred to as "pages". Essentially, a Web site presents advertising or other information regarding a particular organization. A person with a computer and a software system referred to as a "browser" can connect the computer to the Internet (and, hence, to the Web), usually via a telephone line, and with the aid of the browser, access the various Web pages.

Another popular feature of the Internet are so-called "chat rooms". Essentially, a chat room is a computer site that can be accessed (i.e., "logged onto") simultaneously by many users, with each user being able to input text material intended to be conversational in nature. The conversational input from, e.g., a first user is relayed to the computers of the other users who also happen to be logged onto the chat room, such that the text from the first user is presented to the other users. Then, the other users can respond if they like by inputting text material of their own, and their text material is likewise relayed to the other "occupants" of the chat room, including the first user. In this way, computer users around the globe can undertake dialogues with each other in real time. Further, once a dialog has been established between two particular users, the users can arrange to "meet" in (i.e., transfer to) a private chat room that can be accessed only by the two users, so that the two users can continue their conversation in private.

Not surprisingly, particular chat rooms typically are focussed on particular subject matters, so that the general topic of conversation can be known by users prior to entering a chat room. For example, the topic of discussion in one chat room might be off-road vehicles, whereas the topic of discussion in another chat room might be "singles over thirty". Still another topic of discussion might be a popular television show.

As recognized by the present invention, however, chat rooms offer no other real time topic-related features apart from the conversations between users. As further recognized by the present invention, users' enjoyment of chat rooms, particularly cheat rooms focussed on television, radio, or other broadcast programs, can be enhanced with real time enhancement features.

Accordingly, it is an object of the present invention to provide a system and method for real time enhancement of a computer network chat room. Another object of the present invention is to provide a system and method for enhancing a chat room that is focussed on a broadcast program. Still another object of the present invention is to provide a system and method for enhancing a chat room that is easy to use and cost-effective.

SUMMARY OF THE INVENTION

A computer program product includes a computer program storage device that is readable by a digital processing system and a program means on the program storage device. As intended by the present invention, the program device is realized in a critical machine component that causes the digital processing system to perform method steps to establish communication between at least one user computer and at least one chat room in a computer network based on the broadcast time of a broadcast program to which the chat room relates. The method steps include receiving from the user computer a desired program channel, a desired time zone, and a request to enter a chat room. In response to the receiving steps, communication is established between the user computer and the computer network chat room.

In a preferred embodiment, the method steps particularly include establishing communication between a plurality of user computers and a plurality of chat rooms, with at least some of the chat rooms being associated with respective channels in a respective time zone. Also, the method steps can include receiving from the user a request to change time zones, and in response establishing communication between the user computer and a computer network chat room.

Moreover, in the preferred embodiment the method steps also include presenting a broadcast program listing to the user computer. Data representing the number of user computers logged in to a chat room is stored in a viewer file for each broadcast program, and accounting data is provided when the viewer file is transferred.

Accounting data is also generated by additional means. More specifically, advertisements, merchandising pages, and Web pages, all of which are related to the broadcast program, can be presented to the user computer, and accounting data generated based thereon. Furthermore, hyperlinks to additional program-related Web pages can be provided.

The computer program product is also disclosed in combination with the digital processing apparatus, and in further combination with the computer network.

In another aspect, a system is disclosed for keying at least one computer network site to a respective channel over which programs are broadcast. The system broadly includes logic means for providing user computers access to the computer network site when the user computers input data at least representative of: the channel, and a request to communicate with the computer network site.

In another aspect, a computer-implemented method is disclosed for cost accounting in a computer system that simultaneously displays, to user computers, at least one chat window, at least one Web page window, and at least one advertising window. The method includes generating an accounting representative of advertising presented in the advertising window and the period for which it was presented. Additionally, the method includes generating an accounting of user access to the Web page.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
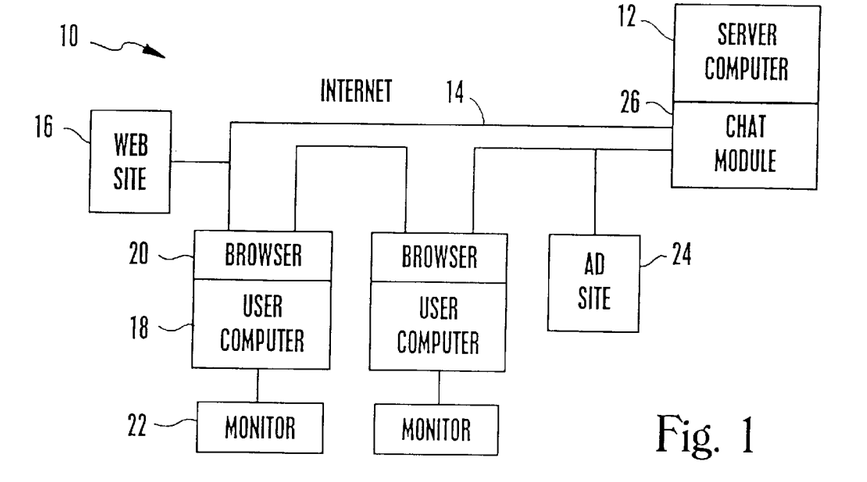
FIG. 1 is a schematic diagram of the chat system of the present invention.

Referring initially to FIG. 1, a system is shown, generally designated 10, which includes a server computer 12, which is part of a computer network. In the preferred embodiment, the server computer 12 is part of the computer network 14 referred to as the Internet, and it can access a portion of the Internet known as the World Wide Web ("Web"). As is well known, the Web includes a plurality of Web sites 16 (only one site 16 shown in FIG. 1). Additionally, plural user computers 18 communicate with the network 14 using respective software-implemented browsers 20 in accordance with well-known principles. As intended by the present invention, the browsers 20 can advantageously be commercial browsers, such as are made by Netscape and Microsoft Corp. Further, each user computer 18 is associated with a respective output device such as a video monitor 22. Moreover, one or more advertising sites 24, each typically implemented by a respective server computer, communicate with the network 14 by well-known means.

As discussed further below, the server computer 12 includes a chat module 26 for facilitating communication between user computers 18 via the network 14, in real time with broadcast programs that establish the subjects of discussion between the user computers 18. Thus, each chat room that is implemented by the chat module 26 relates to a program being broadcast, real-time, over a respective channel. As intended herein, a "broadcast" program means any television or radio program that is delivered on a wide-area basis to plural public recipients by standard wireless broadcast (i.e., from land-based radiofrequency (rf) transmitters), or by cable, or by satellite transmission, or by internet transmission, or by multicast or intercast. Preferably, the broadcast programs are television programs delivered by cable and/or standard wireless broadcast.

Figure 2:
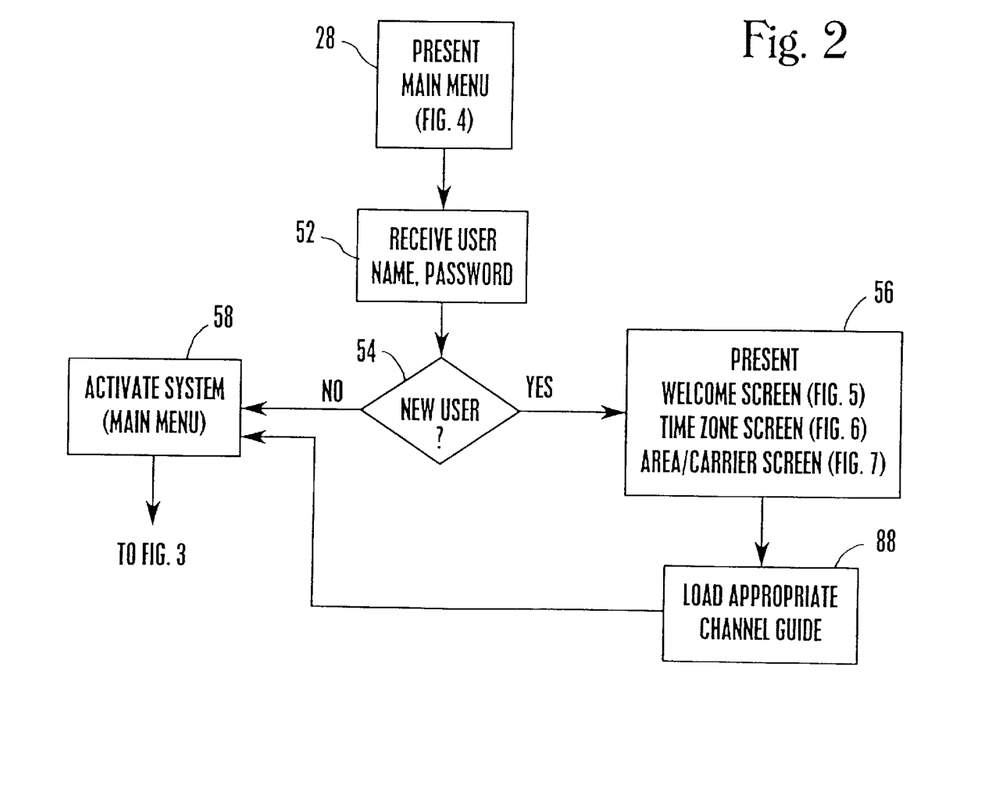
FIG. 2 is a flow chart of the method steps to activate the chat system.
Figure 3:
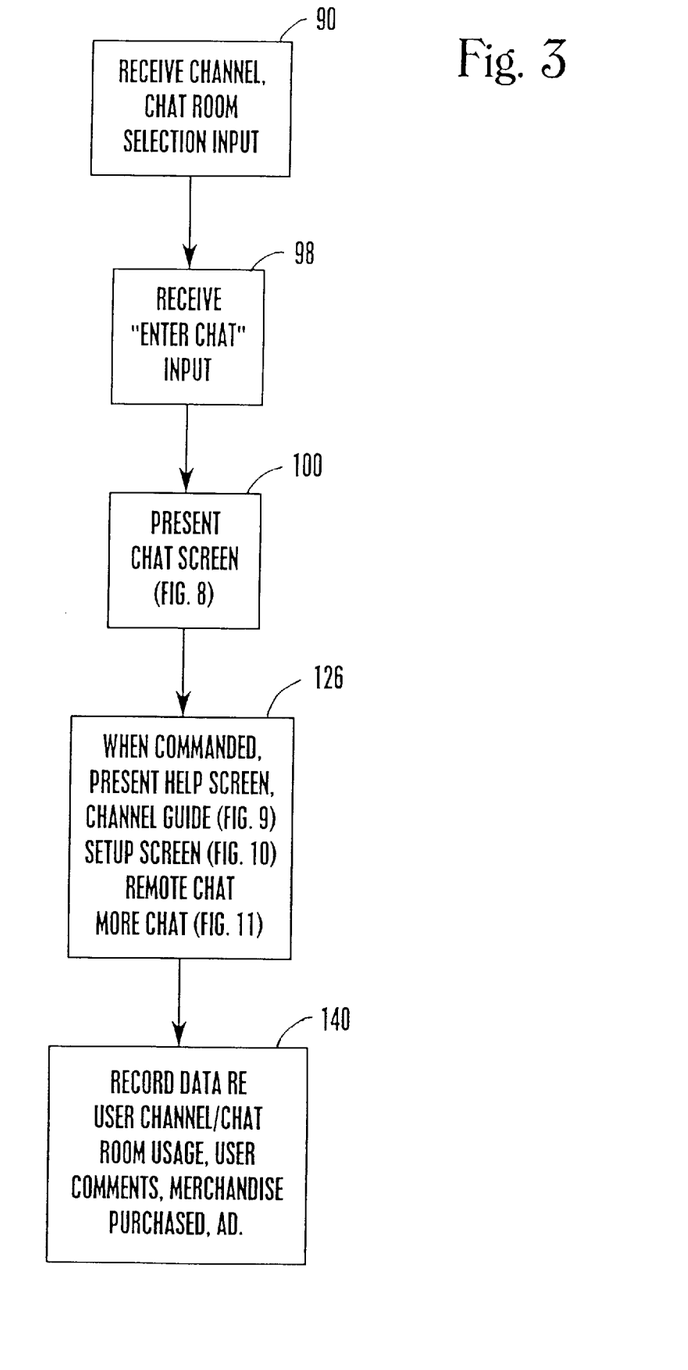
FIG. 3 is a flow chart of the method steps to execute the chat system.

FIGS. 2 and 3 illustrate the structure of the chat module 26 of the present invention as embodied in computer program software. Those skilled in the art will appreciate that the Figures illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown in the Figures.

These instructions may reside on a program storage device including a data storage medium to establish a computer program product, such as a programmed computer diskette. Alternatively, such media can also be found in semiconductor devices, on magnetic tape, on optical disks, on a DASD array, on a conventional hard disk drive, on electronic read-only memory or on electronic random access memory, or other appropriate data storage device associated with the server computer 12. In an illustrative embodiment of the invention, the logic means are computer-executable instructions that are written in Hypertext Mark-up Language (HTML) with Java text and, where appropriate, Illustra database code.

FIG. 2 shows the logic in activating the chat rooms of the present invention. Starting at block 28, a main menu is presented to a user computer 18 by displaying the main menu on the monitor 22, when the associated browser 20 accesses the chat module 26 via the network 14. Although for clarity of disclosure the discussion below focusses on a single user computer 18, it is to be understood that the logic of the present invention applies to plural user computers 18.

Figure 4:
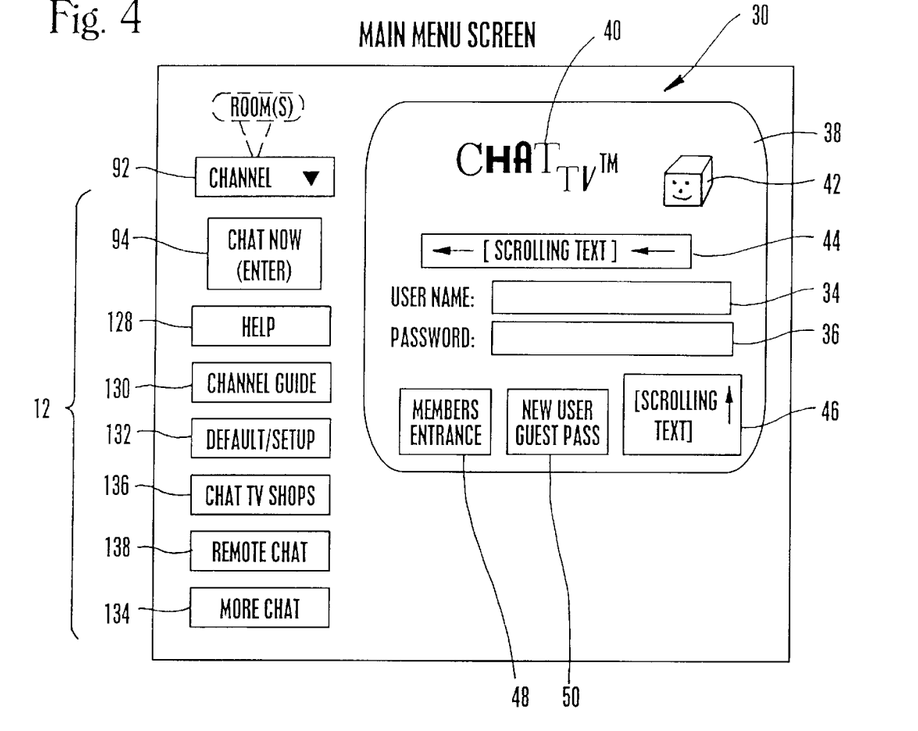
FIG. 4 is a schematic diagram of the main menu screen, with pull-down portions shown in phantom.

A preferred main menu screen 30 is shown in FIG. 4. Initially, selector buttons 32 on the main menu screen 30 are dimmed, whereas user name and password entry bars 34, 36 on a television-like television window 38 are highlighted. Additionally, the television window 38 can include one or more logos 40 and one or more moving or stationary anthropomorphic television-like icons 42. Furthermore, the television window 38 can include a horizontal scrolling window 44 for displaying text information which scrolls from right to left, as well as a vertical scrolling window 46 for displaying text information which scrolls upwardly (looking down on FIG. 4). A members entrance button 48 and new user/guest pass button 50 are also displayed on the television window 38.

With the above disclosure in mind, in cross-reference to FIGS. 2 and 4 a user of a user computer 18 can enter a desired chat user name and password in the user name and password entry bars 34, 36 respectively. This input is received at block 52 in FIG. 2. Or, the user can manipulate a data entry device commonly referred to as a "mouse" that is associated with the user's computer 18 to "click on" (i.e., to select) one of the members entrance button 48 or new user/guest pass button 50.

In either case, the logic of the chat module 26 moves to decision diamond 54 to determine whether the user is a new user. More specifically, if a user name has been entered, the chat module 26 accesses a user database within the server computer 12 to determine whether the user name (and associated password) has been previously recorded therein. If not, or if the user had clicked on the new user button 50, the logic proceeds to block 56, to present a series of screens to be shortly disclosed. On the other hand, if the entered user name (and password) appears in the user database, the logic moves to block 58 to activate the system by highlighting the selector buttons 32. Also, if the user had clicked on the members entrance 48 without inputting a user name and password, the chat module 26 prompts the user to enter his or her user name and password, prior to permitting the user to select one of the selector buttons 32. From block 58, the logic proceeds to FIG. 3.

Figure 5:
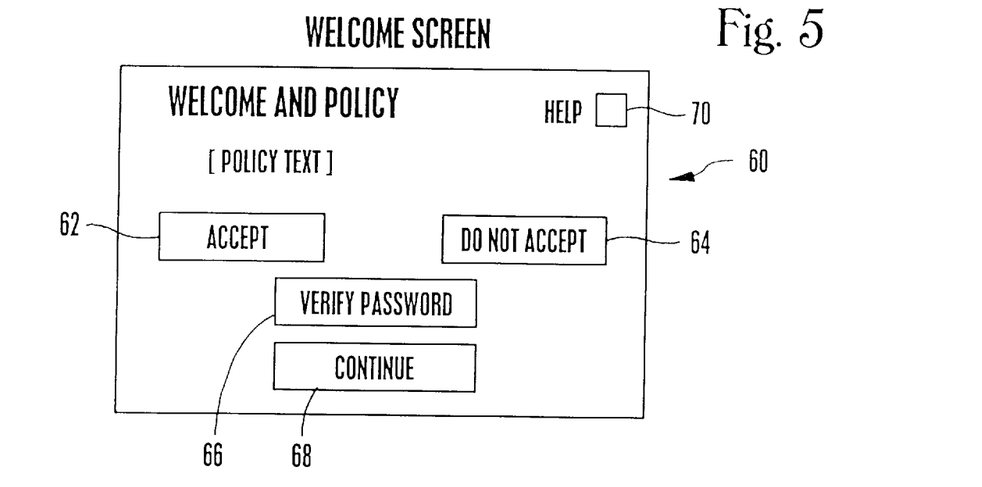
FIG. 5 is a schematic diagram of the welcome screen.

As shown in FIG. 2, at block 56, the chat module 26 presents to the new user a welcome screen 60 (FIG. 5). In cross-reference to FIGS. 2 and 5, the welcome screen 60 presents alpha-numeric data regarding chat room policies, and accept/decline buttons 62, 64 on which the user can click to signify acceptance or declination, respectively, of the policy. If the user selects the accept button 62, the user is prompted to type in his password in a verification box 66. Then, the user can cause a new screen to be presented by clicking on a continue button 68. On the other hand, if the user clicks on the declination button 64, the user is returned to the main menu 30 and denied access to any chat rooms. If desired, a help button 70 can be presented on the welcome screen 60 and on the various other screens discussed below to enable the user to access system instructions in accordance with well-known principles.

Figure 6:
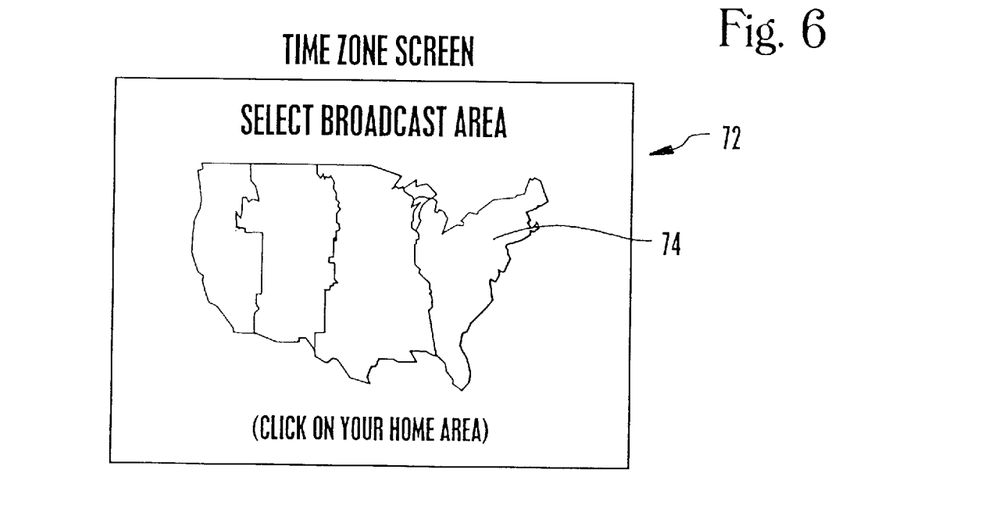
FIG. 6 is a schematic diagram of the time zone screen.

Upon selection of the continue button 68 of the welcome screen 60, a time zone screen 72 (FIG. 6) is presented to the user. As shown in FIG. 6, the time zone screen 72 presents a map 74 of a region, e.g., of the United States, divided into time zones. The user clicks on the appropriate time zone to select his or her home time zone.

Figure 7:
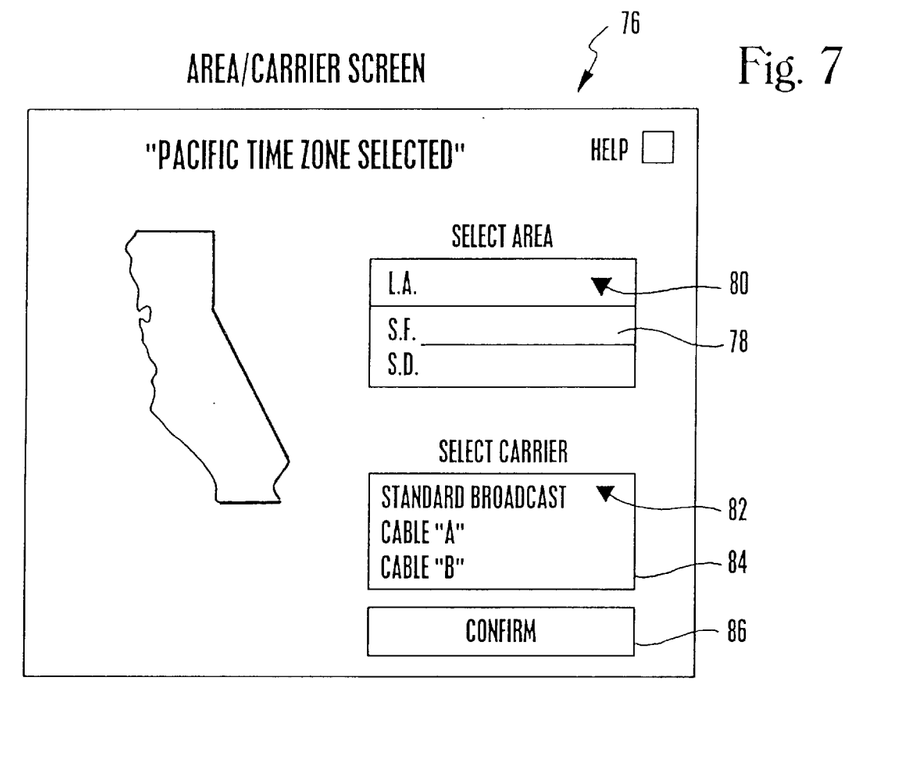
FIG. 7 is a schematic diagram of the area/carrier screen.

As the skilled artisan will appreciate, the chat module 26 receives the home time zone entry and in response presents an area/carrier screen 76 (FIG. 7). With the area/carrier screen 76, the user selects a sub-area within his home time zone, and a program provider, also referred to herein as a carrier. In the example shown in FIG. 7, the home time zone selected in FIG. 6 was the Pacific time zone, and accordingly a select area box 78 is presented which lists various sub-areas within the Pacific time zone, e.g., Los Angeles, San Francisco, San Diego, and so on. The user moves a select arrow 80 to the appropriate sub-area and clicks on the sub-area to select it.

Next, the user moves a select arrow 82 in a select carrier box 84 to select a carrier within the home sub-area. For example, if the user receives television programs via a standard broadcast, the user would select "standard broadcast". In contrast, if the user receives television programs from a "Cable A" service, he would select "Cable A" as shown, and so on. After selecting his home sub-area and carrier, the user clicks on a confirmation box 86 to confirm the entries.

Referring back to FIG. 2, after receiving the user's home sub-area and carrier, the chat module 26 moves to block 88 to correlate a channel guide (discussed further below) with the user's user name. As intended by the present invention, to undertake this correlation the chat module 26 enters a channel guide database within the server computer 12, using the selected home sub-area and carrier provided above as the entering argument. In other words, each channel guide in the channel guide database is associated with a particular carrier in a particular sub-area. The channels listed in each channel guide establish the bases for the respective chat rooms that are made available to the user as discussed more fully below. From block 88, the chat module 26 proceeds to block 58 and thence to FIG. 3. Thus, each chat room is keyed to a respective channel.

In cross-reference to FIGS. 3 and 4, the chat module 26 receives a desired channel and chat room input from the user at block 90 in FIG. 3. Specifically, once the user name and password have been accepted by the chat module 26, the user places his cursor over a channel select button 92 and accordingly can scroll through the channels that are available from his carrier, as determined by the channel guide loaded at block 88 in FIG. 2, to select one of the channels as the basis for a chat room conversation.

As also indicated in FIG. 4, upon selection of a channel, a pull-down room select button 94 (shown in phantom in FIG. 4) appears next to the channel select button 92. In accordance with the present invention, the room select button 94 presents the chat rooms that have been established for the selected channel, e.g., "over 40", "die hard fans", etc. The user scrolls through the available chat rooms for the selected channel and selects one by clicking on the room select button 94.

To enter a chat room, the user then clicks on an "enter chat" button 96. This input is received by the chat module 26 at block 98 in FIG. 3. Then, at block 100 the chat module 26 presents a chat screen 102 (FIG. 8) to the user.

The preferred chat screen 102 will be described in reference to FIG. 8, after which the description of the logic shown in FIG. 3 will be completed. Now referring to FIG. 8, The chat screen 102 includes a Web page/merchandise window 104. A broadcaster button 106 can be selected to cause the Web page of the network that is broadcasting the program on the selected channel to be displayed in the window 104. Likewise, a program button 108 can be selected to cause the Web page of the producer of the program that is being broadcast on the selected channel to be displayed in the window 104. In an alternative embodiment, when the broadcast program is also being broadcast on the network 14, the program itself can be displayed in the window 104.

Alternatively, the user can click on a merchandise button 110 to cause merchandising text and/or video to be displayed in the window 104. The merchandising so marketed is related to the program which is currently being broadcast on the selected channel. When the merchandising button 110 is selected, pull-down merchandising category buttons 112 (shown in phantom) are also displayed in the window 104, to enable the user to select a desired category. For example, as shown the categories can include gifts, apparel, other, and a merchandise index. The user can purchase program-related merchandise by selecting the merchandise from the window 104 in accordance with well-known Web purchasing principles.

If desired, a game select button 114 can be provided to enable the user to cause a desired game to be presented in the window 104, for playing the game real-time with another user in the selected chat room while the television program is being broadcast. Also, a first advertising window 116 can display an advertisement from an advertiser of the program being broadcast on the selected channel. Similarly, a second advertising window 118 can display an advertisement from an advertiser of the program being broadcast on the selected channel. Accounting data is kept that represents the time period during which each advertisement was displayed, as well as the number of users who were present in the chat room during display. The advertising can be scheduled and loaded into the advertising windows 116, 118 remotely from the advertising site 24 (FIG. 1).

In addition, the chat screen 102 displays a common chat window 120 below the web page window 104. As shown, the common chat window 120 presents to all occupants of the particular chat room text that is input by the occupants of the chat room, along with the inputting occupants' user names. An input window 122 is provided for each user which displays the text of the user's chat, prior to the user transmitting it for display to other users on the chat window 120.

In addition to the features of the chat screen 102 disclosed above, other features can be invoked by selecting an other button 124. Upon selection of the other button 124, a list of other features can be presented to the user, and one or more of the features can be selected by clicking on the feature in the list. Set forth below is an example of such a list, with an explanation of each feature.

"Chat basics"—a help feature;

"Return/exit"—Main menu (FIG. 4) presented;

"Instant Ratings"—displays in graphical form the number of chat room occupants, per channel-based chat room;

"Another chat world"—transports the user to another chat world, e.g., the chat world operated by a television network. To facilitate such transport while avoiding duplication of a user name in the other chat world, a tag, such as a color, or suffix character string, or, more preferably, a prefix character string that is representative of the chat module 26 is added to the user's user name. In other words, a tag that is unique to the chat world of the chat module 26 is associated with the user's user name;

"Links"—when selected, displays hyperlinks to Web pages that are related to either the broadcaster's Web page or program producer's Web page or to the program itself. Selection of one of the hyperlinks causes the associated Web page to be displayed in the Web page window 104;

"Chat events"—lists chat events, including pay-per-chat events, that will be available at some future time. By selecting one of the chat events, the user can pay for the event and obtain a special password for the event; and "Theater chat"—when selected, the user audibly hears and speaks to other occupants in the chat room who have also selected this option, provided that the users' computers 18 are equipped with appropriate sound systems.

Recall that the user can return to the main menu 30 (FIG. 4) when desired. Referring back to FIGS. 3 and 4, at block 126 in FIG. 3 the chat module 26 presents upon command a help screen (not shown), a channel guide (FIG. 9), a setup screen (FIG. 10), and a more chat screen (FIG. 11) when the user respectively clicks on a help button 128, a channel guide button 130, a default/setup button 132, and a more chat button 134. The screens that are invoked by selecting these buttons will be addressed shortly.

Figure 8:
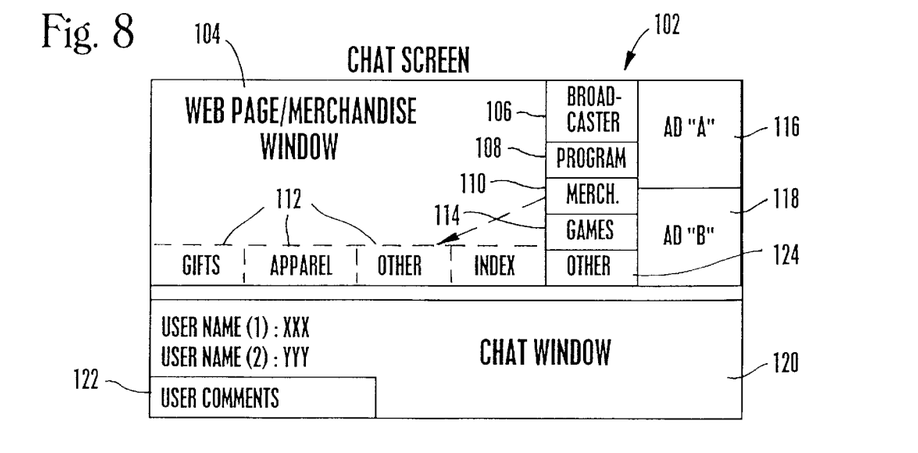
FIG. 8 is a schematic diagram of the chat screen, with pull-down portions shown in phantom.

In addition, the user can click on a chat TV shops button 136 to enter the merchandising presentation of the Web page window 104 of the chat screen 102 shown in FIG. 8. Also, the user can access chat rooms ("remote chat rooms") for channels that are remote from the user's home area by clicking on a remote chat button 138. Selecting the remote chat feature invokes the time zone screen 72 shown in FIG. 6 and the area carrier/screen 76 shown in FIG. 7 to facilitate selection of the remote chat room in the same manner as the home sub-area and channel are selected, as described above. The chat module 26 provides a bookmark to the user to indicate the selected remote chat area, and the logic proceeds as before in enabling the user to enter the remote chat rooms, with the understanding that the remote chat rooms are keyed to the broadcast channels in the respective remote areas.

At block 140, accounting data is generated. More specifically, at block 140 the number of user computers logged in to a chat room is stored in a viewer file for each broadcast program, and accounting data generated based thereon. Chat comments from the viewers can also be stored for later resale to ratings companies.

Additionally, accounting data is generated for each advertisement displayed on the advertising windows 116, 118 of the chat screen 102 (FIG. 8) and the length of time each advertisement was displayed. Moreover, accounting data can be generated for each Web page that is displayed in the Web page window 104 of the chat screen 102. This data can account for the number of users who accessed further information from each displayed Web page, e.g., from hyperlinks. Still further, accounting data is generated based on the merchandising information pages that are displayed in the Web page window 104, and based on the merchandise that is purchased using the merchandising pages.

Figure 9:
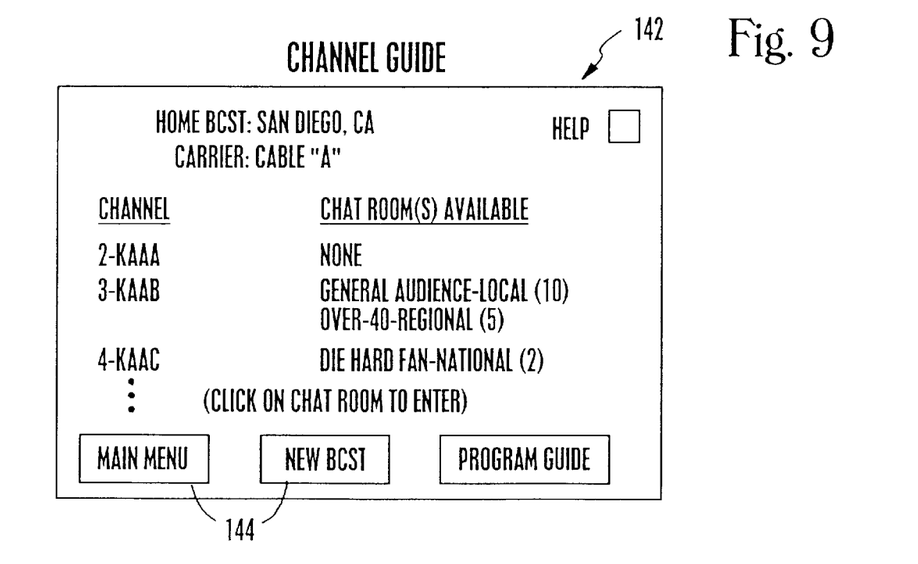
FIG. 9 is a schematic diagram of the channel guide screen.

As mentioned above, the chat module 26 presents various additional screens to the user upon the user selecting one of the selector buttons 32 on the main menu screen 30 (FIG. 4). For example, a channel guide 142 (FIG. 9) is presented when the user clicks on the channel guide selector button 130 on the main menu screen 30 (FIG. 4). As shown in FIG. 9, the channel guide 142 presents the user's home broadcast area and home carrier, under which is presented a two-column table. In the first column, the channels with call signs that are available from the home carrier are listed, while in the second column, the chat rooms that are currently available for each channel are listed. Each listed chat room indicates the nature of the chat room, whether the chat room contains only local viewers, or regional/national/international viewers (who have entered the chat room by means of the remote chat feature disclosed above). The number of occupants of each chat room is also listed.

Thus, for example, if a user selected channel 3, the user could learn from the channel guide 142 that two chat rooms currently exist which are dedicated to conversations about the program being aired real-time over channel 3. In one chat room, the occupants include ten (10) general audience members, all from the user's home (local) area, who want to discuss the program being aired real-time over channel 3. On the other hand, five (5) over-40 occupants from the user's region occupy another channel 3 chat room. As also shown in FIG. 9, the user can enter a chat room directly from the channel guide 142 by clicking on the desired chat room. Further, selector buttons 144 are provided which, as shown, enable the user to return to the main menu 30, or to select the channel guide of another broadcast, or to access a program guide.

Figure 9A:
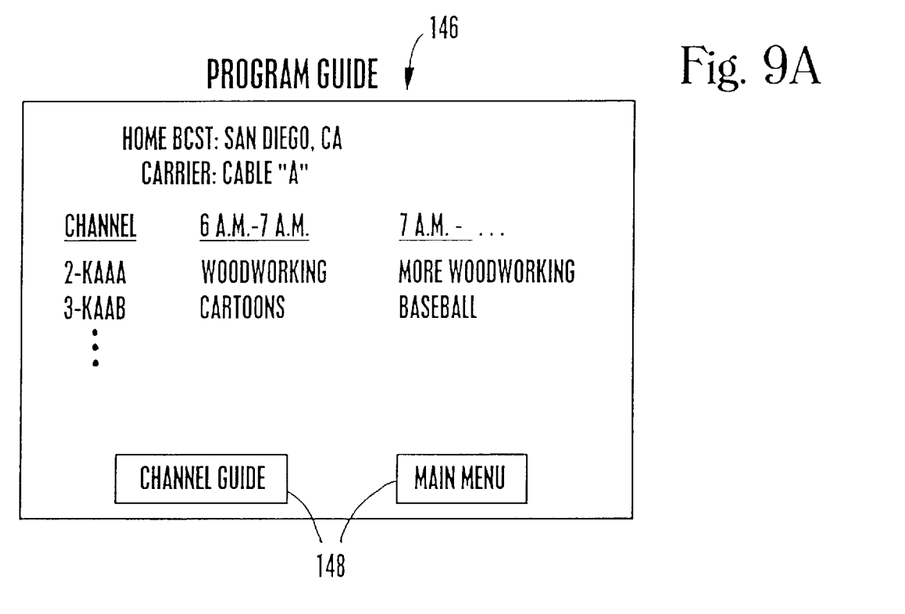
FIG. 9A is a schematic diagram of the program guide screen.

FIG. 9A shows a program guide 146 of the present invention. As shown in FIG. 9A, the program guide 146 presents the user's home broadcast area and home carrier, under which is presented a multi-column table. In the first column, the channels with call signs that are available from the home carrier are listed, while in the remaining columns, the programs available on each channel are listed by broadcast time. Selector buttons 148 are provided which, as shown, enable the user to return to the main menu 30, or to return to the channel guide 142.

Figure 10:
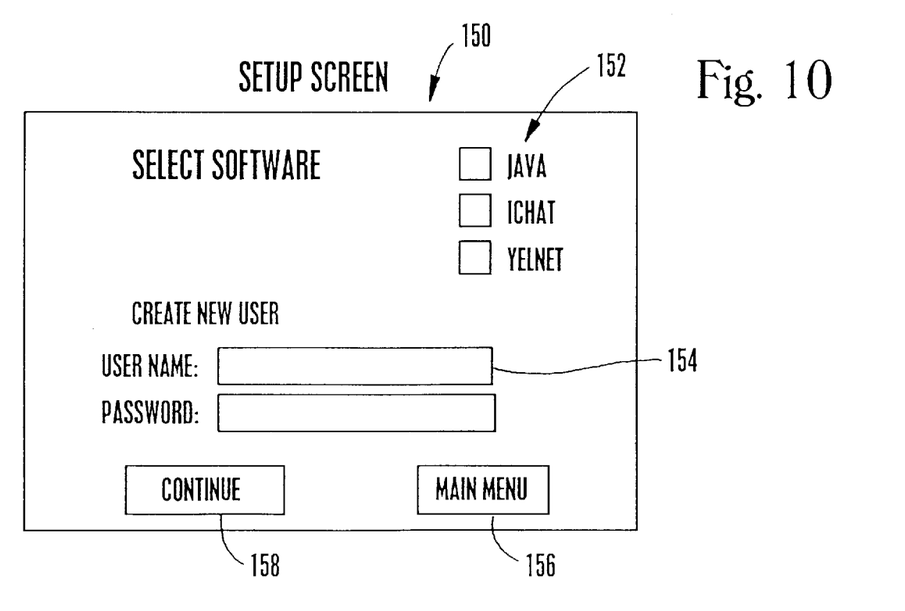
FIG. 10 is a schematic diagram of the setup screen.

When in the main menu 30 (FIG. 4), the user can select the default/setup button 132 to invoke the setup screen 150 shown in FIG. 10. As shown in FIG. 10, the user can indicate his system software by selecting a software from a list 152. Also, the user enters his desired user name and password in data entry bars 154. The user car return to the main menu 30 by selecting a main menu select button 156. Alternatively, the user can continue to the welcome screen 60 (FIG. 5) to proceed as discussed above by selecting a continue button 158.

Figure 11:
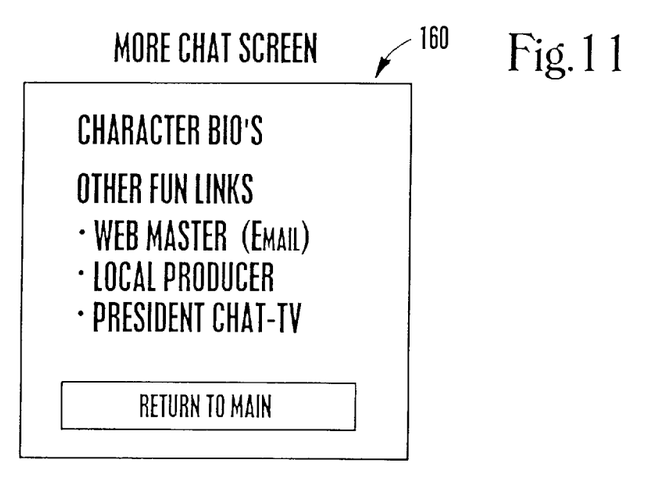
FIG. 11 is a schematic diagram of the more chat screen.

FIG. 11 shows a more chat screen 160 that can be invoked by selecting the more chat button 134 on the main menu 30. As shown, the more chat screen 162 lists various ancillary selections that can be clicked on the invoke the selections. For example, the user can access biographies of the characters in the program currently being aired on the selected channel. Or, the user can access E-mail, or the Web sites of the program producer, or of the president of the chat room provider, and so on.

While the particular COMPUTER NETWORK CHAT ROOM BASED ON CHANNEL BROADCAST IN REAL TIME as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A computer program product comprising:

a computer program storage device readable by a digital processing system; and logic means on the program storage device and including instructions executable by the digital processing system for performing method steps for establishing communication between at least one user computer and at least one chat room in a computer network based on the broadcast time of a broadcast program to which the chat room relates, the method steps comprising:

(a) receiving from the user computer a desired program channel;

(b) receiving from the user computer a desired time zone;

(c) receiving from the user computer a request to enter a chat room;

(d) in response to the receiving steps, establishing communication between the user computer and the computer network chat room;

storing in a viewer file for each broadcast program, the number of user computers logged in to a chat room; and providing accounting data based on the viewer file.

2. The computer program product of claim 1, wherein the method steps further comprise establishing communication between a plurality of user computers and a plurality of chat rooms, at least some of the chat rooms being associated with respective channels in a respective time zone.

3. The computer program product of claim 1, wherein the method steps further comprise:

(e) receiving from the user a request to change time zones; and (f) in response to step (e), establishing communication between the user computer and a computer network chat room.

4. The computer program product of claim 1, wherein the method steps further comprise presenting a broadcast program listing to the user computer.

5. The computer program product of claim 1, wherein the method steps further comprise:

presenting an advertisement related to the broadcast program to the user computer; and providing accounting data based on the providing step.

6. The computer program product of claim 1, wherein the method steps further comprise:

presenting a first Web page related to the broadcast program to the user computer; and providing accounting data based on the providing step.

7. The computer program product of claim 6, wherein the presenting step further includes presenting hyperlinks to Web pages other than the first Web page that are related to the broadcast program.

8. The computer program product of claim 1, wherein the method steps further comprise:

presenting a merchandise computer page to the user computer, wherein merchandise presented on the merchandise computer page is related to the broadcast program; and providing accounting data based on the providing step.

9. The computer program product of claim 1, in combination with the digital processing apparatus.

10. The combination of claim 9, in further combination with the computer network.

11. A system for keying at least one computer network site to a respective channel over which programs are broadcast, comprising:

logic means for providing user computers access to the computer network site when the user computers input data at least representative of: the channel, and a request to communicate with the computer network site;

logic means for presenting a first Web page related to the broadcast program to the user computer; and logic means for presenting hyperlinks to Web pages other than the first Web page that are related to the programs.

12. The system of claim 11, wherein the computer network site is a chat room, and the system further comprises:

logic means for receiving from the user computer a desired time zone;

logic means for receiving from the user computer a request to enter a chat room;

logic means for establishing, in response to the receiving steps, communication between the user computer and the computer network chat room; and logic means for presenting a broadcast program listing to the user computer.

13. The system of claim 11, further comprising:

logic means for presenting an advertisement related to the broadcast program to the user computer;

logic means for presenting a merchandise computer page to the user computer, wherein merchandise presented on the merchandise computer page is related to the programs; and logic means for providing accounting data in response to at least some of the means for presenting.

14. The system of claim 13, further comprising:

logic means for storing in a viewer file for each program, data representative of the user computers in communication with the respective chat room; and logic means for providing accounting data in response to the means for storing.

15. The computer program product of claim 14, in combination with a digital processing apparatus.

16. The combination of claim 15, in further combination with a computer network.

17. A computer-implemented method for cost accounting in a computer system simultaneously displaying, to user computers, at least one chat window, at least one Web page window, and at least one advertising window, wherein the computer system displays at least one merchandising window simultaneously with the chat window, comprising the steps of:

generating an accounting representative of advertising presented in the advertising window;

generating an accounting of user access to the Web pages;

generating an accounting of merchandise transactions executed via the merchandising window; and generating an accounting based on user data from the computer system, and further wherein the computer system includes a plurality of chat windows, each chat window establishing a respective channel chat room, and wherein the user data includes the number of users per channel chat room.

* * * * *